United States Patent [19]

Yang et al.

[11] Patent Number: 4,586,792

[45] Date of Patent: May 6, 1986

[54] ELECTRONIC DISPLAY ELEMENT

[75] Inventors: Sze C. Yang, Kingston; Richard R. Durand, Jr., West Kingston, both of R.I.

[73] Assignees: Board of Governors for Higher Education, State of Rhode Island; Providence Plantations, both of Providence, R.I.

[21] Appl. No.: 646,232

[22] Filed: Aug. 31, 1984

[51] Int. Cl.[4] .............................................. G02F 1/01
[52] U.S. Cl. .................................................... 350/357
[58] Field of Search ................................. 350/357, 363

[56] References Cited

U.S. PATENT DOCUMENTS 4,009,936  3/1977  Kasai ................................... 350/357

OTHER PUBLICATIONS

T. Kobayashi et al, "Polyaniline Film-Coated Electrodes as Electrochromic Display Devices", *J. Electroanal Chem.*, 161 (1984) pp. 419–423.

Primary Examiner—Norman Morgenstern
Assistant Examiner—Kenneth Jaconetty
Attorney, Agent, or Firm—Thompson, Birch, Gauthier & Samuels

[57] ABSTRACT

An electronic display device having a polyaniline film coated on a transparent electrode. The film has electrochromic properties and will display at least three distinct reproducible color changes.

6 Claims, 1 Drawing Figure

U.S. Patent     May 6, 1986     4,586,792
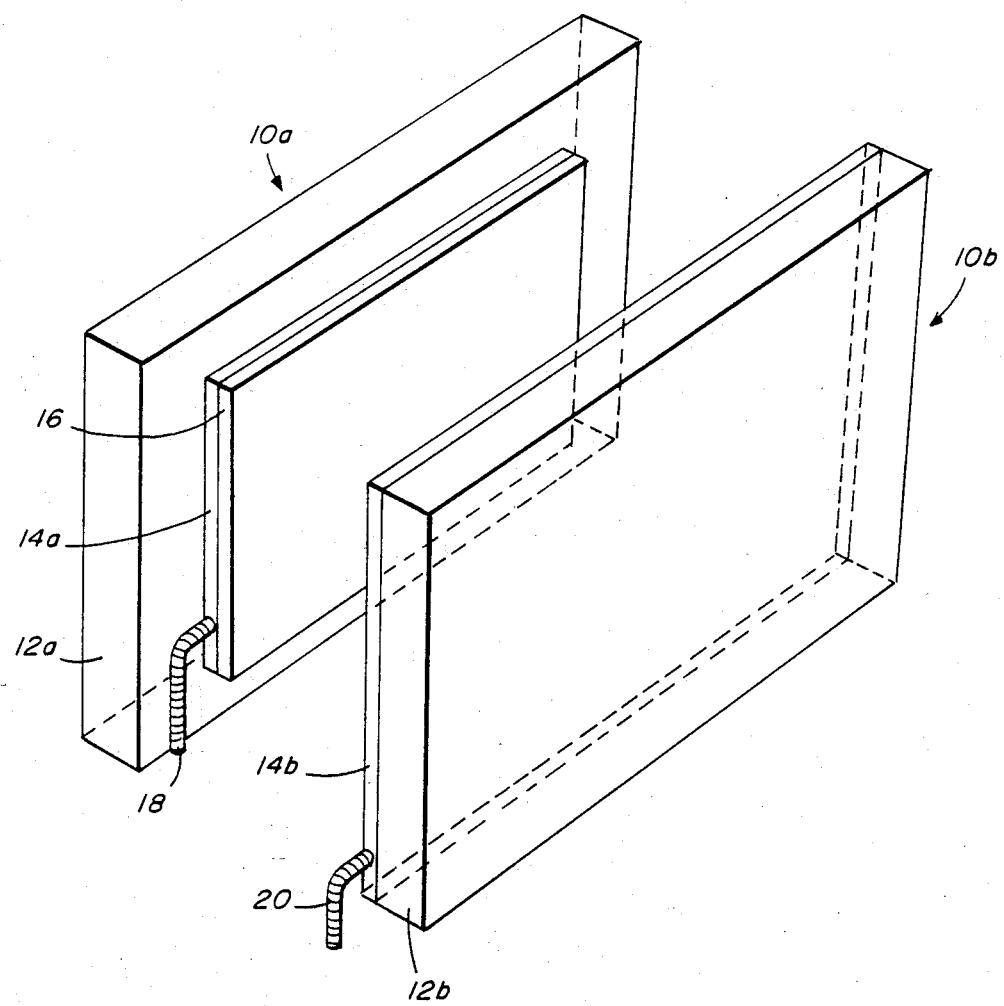

ELECTRONIC DISPLAY ELEMENT

BACKGROUND AND BRIEF SUMMARY OF THE INVENTION

Flat panel display devices have become a major area of interest to electronic related industries. Flat displays will provide more compact desktop and transportable computers and aid in the development of computer-telephones. The projected U.S. and worldwide markets for flat panel displays are estimated to reach 450 million and 2 billion dollars by the end of this decade, J. A. Castellano, *Digital Design*, May 1984, p. 2.

There are several approaches that are currently being examined and marketed. Among these are: flat cathode ray tubes, light emitting diodes, plasma displays, vacuum flourescent displays, liquid crystals, and other electroluminescent displays, J. I. Pankove, *Topics in Applied Physics: Display Devices*, Volume 40, J. I. Pankove (ed.), Springer-Verlag, New York (1980), p. 1. Liquid crystal displays are currently the most widely used for flat passive displays. The area of largest anticipated growth lies in devices which have a high contrast, bright background passive display with low power consumption. Such devices could effectively compete with and/or replace liquid crystal displays. Electrochromic devices are acknowledged as theoretically capable of producing the desired properties.

Electrochromism describes the induction of a color change in a medium as a result of charge transfer or electron transfer caused by an externally applied potential. The color changes are indications of induced chemical changes in the species of interest. For most chemical species exhibiting this effect, the change is from one color to another. As an example, viologen dye molecules change from yellow-orange to blue when reduced at a cathode. J. Bruinik, C. G. A. Kregting, and J. J. Ponjee, *J. Electrochem. Soc.* 124, 1853 (1977). Solid films of $WO_3$ also show electrochromism with transparent films becoming blue upon reduction.

In order for electrochromic materials to be useful for display purposes, they must have optical absorption in the visible spectrum and exhibit mixed conduction capability (i.e. electronic and ionic). It is also highly desirable to exhibit high contrast from the background in order to modulate ambient light. Electrochromic materials generally have these properties. Electrochromic materials are usually operated with low voltages and can provide suitable contrasts with charge transfer of only several millicoulombs of electrical charge per square centimeter of display area. Erasure is easily made by polarity changes. These materials may also have the ability to hold images for the required response time of the human eye (about 0.1 second) and this further may allow for the use of memory effects. A major disadvantage of electrochromic displays is the lifetime of the device. Chemical degradation frequently occurs as usage time increases.

The most studied systems which utilize the electrochromic effect are displays based on $WO_3$. B. W. Faughnan, *Topics in Applied Physics: Display Devices*, Volume 40, J. I. Pankove (ed.,), Springer-Verlag, New York, (1980), p. 181. Amorphous films of $WO_3$ have high ion mobilities as necessary and exhibit coloring and bleaching between blue and transparent colors. The device lifetime is extremely sensitive to the presence of oxygen and water. To date, a commercial viable system based on the oxide films has yet to be produced.

Organic species have also been examined as an alternative but frequently lack the desired contrast since they convert between two distinct colors and do not have a transparent form. J. Bruinick, C. G. A. Kregting, and J. J. Ponjee, *J. Electrochem. Soc.* 124, 1853 (1977). M. M. Nicholson and F. A. Pizzarello, *J. Electrochem. Soc.* 127, 821 (1980).

Polyaniline is the chemical name given to the product of anodic oxidation of aniline. The formation of polymeric compounds by oxidation of aniline has been known for some time. S. Venkataraman, *Chemistry of Synthetic Dyes*, Volume II, Academic Press, New York (1952), p. 772. The products are highly colored films or solids. The first modern electrochemical study of this oxidation at solid electrodes was carried out by Adams and co-workers. D. M. Mohilner, R. N. Adams, and W. J. Argersinger, Jr., *J. Am. Chem. Soc.* 84, 3618 (1962). A polymeric product was obtained which they suggested to be an octamer of head to tail para coupling of aniline monomers.

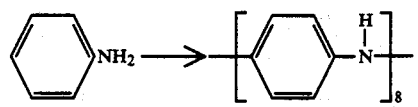

This octamer was prepared in sulfuric acid electrolyte. It has been suggested to be emeraldine sulfate, a highly colored salt which had been observed in previous studies involving chemical oxidation. Since their original paper, Adams and coworkers have acknowledged that other coupling modes (i.e. head-to-head or tail-to-tail) are possible. J. Bacon and R. N. Adams, *J. Am. Chem. Soc.* 90, 6596 (1968). Although the polymeric nature of this oxidation product has been suggested for many years, the full characterization has remained inconclusive. Renewed interest in the structural nature of the polymer has been generated by recent findings of its good electrical conductivity. A. F. Diaz and J. A. Logan, *J. Electroanal. Chem.* 111, 111 (1980). They noted that the polymer is conducting in both anodic and cathodic regions. They also noted that the film color can be altered by varying the electrode potential.

A more recent article has presented a brief spectral characterization of films grown on indium oxide electrodes. T. Kobayashi, H. Yaneyama, and H. Tamura, *J. Electroanal. Chem.* 161, 419 (1984).

Our invention is in part based on the fact that polyaniline films are conducting and although it has not been established, it is believed that there are ionic and electronic contributions to its conductive properties. It is expected that relatively high ion mobilities (particularly proton) are found for this films. The films are prepared in aqueous solution and do not dissolve. They are also relatively stable toward oxygen.

Our invention embodies a electronic display element useful in electronic color display devices. Broadly, our invention comprises two electrodes, at least one electrode being transparent, having electrolyte disposed therebetween. A thin film of polymeric aniline or its chemical derivatives is placed in electrical communication with at least one of said electrodes. In a preferred embodiment, the polymeric film is coated electrolytically on the anode using an acidic solution containing the monomeric aniline. After the polymer film is coated, the solution is replaced by an acidic electrolyte solution which does not contain aniline monomer. Applying different voltages across the interface between the polymer film and the electrolyte results in color changes of the film. Color changes achieved to date include blue, green, yellow and transparent. The color changes are sharp and distinct and repeated cycling of the voltage does not cause degradation of the film and the response time of the color change is short.

The display element of our invention overcomes the prior art problems of longevity and the prior art problems of the inability of the films to repeatedly produce color changes, including transparent, which are necessary for successful application of electrochromism in electronic color display devices. Further advantages of our invention are a display screen in a thin plate or rollable sheet which consumes a minimal amount of electrical power. Further, the area of the display device can be very large in reference to the physical limitations imposed on the presently available cathode-ray tubes. Most importantly, a multicolor display is achieved which capability is not available in present liquid crystal display devices.

BRIEF DESCRIPTION OF THE DRAWINGS

The drawing is a schematic of a display device embodying the invention.

DESCRIPTION OF THE PREFERRED EMBODIMENT

Two properties of polyaniline are unique for organic polymers, and are highly desirable for electrochromic display: (1) the capability for multi-color switching, and (2) the capability of producing a transparent form at a reducing potential. The transparent form provides the needed high contrast in display. The properties noted here suggest that such a species is especially suitable for use in a electrochromic display device.

The origin of the unique electrochromic effect for polyaniline is most likely due to structural changes occurring in the polymer backbone upon electrochemical cycling. In the most oxidized form, these should be extensive—conjugation along the backbone producing the intense blue color. In the most reduced form, there should be little conjugation and thus the transparent color results. Schematically the two extremes can be depicted as:

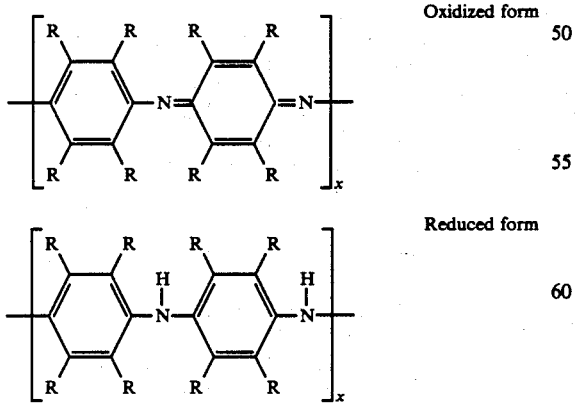

The intermediate colors from blue-green to yellow are due to various compositions of oxidized and reduced moieties including delocalized polymer radicals and polymer cations. A polymer backbone structure containing aromatic rings linked by nitrogen atoms is favorable to the electrochromic properties because of the stability of these colored polymer radicals and anions. Polymers built from monomers with structures I, II and III (see below) all have such favorable backbone structures and they are suitable as a electrochromic display material. The nature of anions present and pH of the electrolyte also influence the color distribution since the acid-base characteristics of the polymer are important to film properties. It is also plausible that the polymer contains more than one kind of monomer unit or crosslink between chains. Both of these structural possibilities could contribute to the tunability of the film color.

The addition of substituent groups to the aromatic rings can alter the properties of the films. Electron withdrawing substituents such as nitro groups would lower the oxidation potentials, whereas electron donating groups will tend to raise these potentials. Thus, the window of accessible potentials is tuned as will the color of the films, due to changes in electronic structure. Appropriate choice of a combination of substituent grups will provide flexibility in modifying the electrochromic properties of the polymer films. By choosing a combination of substituent groups the electrochromic properties of the polymer film can be modified. These polymers can be prepared from the monomers of the structures I, II, and III where $R_1$ to $R_8$

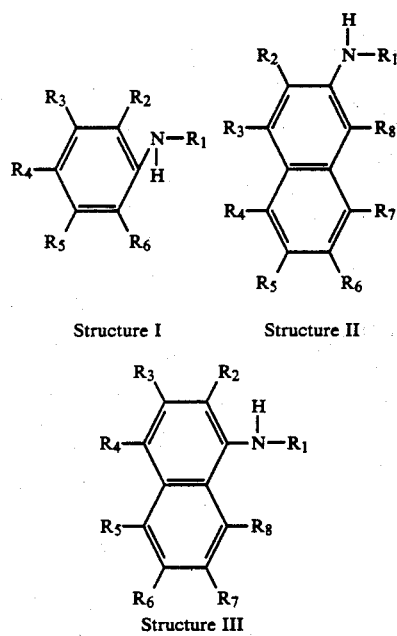

Structure I    Structure II

Structure III

=any one of the following:
—H, —(CH$_2$)$_n$CH$_3$ (n=o to 10), —OCH$_3$, —OC$_2$H$_5$
—Cl, —F, —Br, —I, —CN, —SO$_3$H, $$-\underset{\underset{O}{\|}}{C}-OH \quad -\underset{\underset{CH_3}{|}}{C}=O \quad -NO_2, \quad -(CH_2)_m-\underset{\underset{X}{|}}{(CH)_n}-(CH_2)_l-CH_3$$

(where m, n, l=0 to 5 and X=any of the above groups)

Referring to the drawing, electrodes 10a and 10b are made of glass plates or plastic sheets 12a and 12b with transparent conductive coatings 14a and 14b (such as tin oxide, indium oxide or thin transparent metal films such as platinum or gold) disposed on their inwardly facing surfaces. One of the two electrodes 10a has, in addition, a thin film of an electrochromic polymer film 16 disposed on the tin oxide coating 12a.

The preparation of the electrochromic polymer film, 16, is accomplished by electrochemical polymerization of monomers with structures of I, or II, or III dissolved in acid solution such as 0.1M HCl using standard techniques. The polymer is coated on the anode during the polymerization process. The control of film thickness is accomplished via monitoring the charge accumulated during electrolysis of aniline at +0.7 V vs. Ag/AgCl.

Alternatively, the electrochemical polymerization can be carried out after an ion-exchanging resin, Nafion ® (a polyfluorinated sulfonate commercially available polymer), is cast on the tin oxide coating prior to electrolysis. This modification is useful for improving chemical stability of the electrochromic polymer coating. The polymerization occurs within the film after the protonated monomer (I, or II, or III) has gone into the Nafion ® film via ion-exchange properties.

After the polymerization/coating process is done, the monomer solution is replaced by an electrolytic solution (not shown). The choice of electrolyte is important to film properties. Because the anions in the electrolyte interact with the polymer cations they can be used to adjust the properties of the polymer for a specific application. For example the trifluoroacetate and trifluoromethane sulfonate are weakly associating to the polymer cation but the chloride anions are more polarizable and interact with the polymer more strongly. Strong organic or inorganic acids and the salts of their conjugated bases are suitable. Especially suitable also are trifluoroacetic acid, sodium trifluoroacetate, hydrochloric acid, potassium chloride and phthalate buffer solutions.

The color of the transparent polymer film can be changed by applying voltage across the interface between the film and the contacting electrolyte. The voltage switchable colors at the present time include blue, green, yellow and transparent over a potential range of $-0.2$ V to $+0.6$ V vs Ag/AgCl. The response time to color change is short and repeated cycling between these potentials is reproducible for long times. From the available data, the color switching properties are expected to be reproducable for more than one (1) million cycles.

A display screen can be made from an array or a matrix of display elements. With existing technology, these elements can be made as small dots or squares with a linear dimension less than 0.1 millimeter. The voltage applied to each display element can be independently controlled to produce different colors at different locations of the screen. This will allow the display of a picture in high resolution with a range of colors and tones. The technology for producing the array of display elements and the associated controlling circuitries has been developed for commercial liquid crystal display devices, and can be adapted for use in electrochromic devices. Several thin plates (or sheets) of the display panels can be superimposed to allow more variability in colors and tones.

Experiments were conducted to demonstrate that polyaniline does have the desired electrochromic properties. The conventional three electrode geometry was utilized. The working electrode was a thin glass plate (1/16th inch thickness) coated with a thin film of tin oxide (surface resistance $25\Omega/\square$). A platinum wire counter electrode and a saturated calomel reference electrode were used. The experiments were carried out in a quartz cell, dimensions one centimeter by one centimeter by four centimeters, to which above electrodes were added. The polyaniline medium was prepared separately in acidic electrolyte containing the aniline monomer and then transferred to pure electrolyte (1M trifluoracetic acid) in the quartz cell. Potentials were applied with a Wenking potentiostat Model LB 75 L. The color changes of the polymer were measured with a UV-Visible Spectrometer, Varian Model DMS-90. At 0 volts the polymer was transparent. At $+0.2$ volts the polymer was light yellow. At $+0.4$ volts the polymer was green. At $+0.5$ volts the polymer was blue. At $+0.6$ volts the polymer was blueish purple.

As set forth above with the basic structures and the combinations of the substituent groupings R1–R8; m, n, and 1, and X either alone or in combination with various electrolytes the color changes and numbers of distinct colors can be controlled. In experiments to date, color changes of a specific polymer through at least a thousand changes still showed the same sharpness and intensity in the colors produced and further the display device when exposed to oxygen and water (moisture) showed no signs of degradation over a period of at least four months.

What is claimed is:

1. An electronic display element which comprises:
   first and second electrodes in electrolytic communication at least one of said electrodes being transparent;
   a polymer formed from monomeric aniline coated on one of said electrodes the polymer characterized in that it will display at least three distinct color changes in response to voltages applied to the electrodes which color changes are reproduceable.

2. The display element of claim 1 wherein the electrodes are transparent conductive coatings.

3. The display element of claim 2 wherein the transparent conductive coatings are metal coatings.

4. The display element of claim 3 wherein the transparent conductive coatings are selected from the group consisting of tin oxide, indium oxide, gold and/or platinum.

5. The display element of claim 1 wherein the electrolyte is selected from the group consisting of trifluoroacetate, trifluoromethane sulfonate, trifluoroacetic acid, sodium trifluoroacetate, hydrochloric acid, potassium chloride and/or phthalate buffer solutions.

6. The display element of claim 1 wherein the polymer is formed by the polymerization of the monomers selected from the group consisting of:

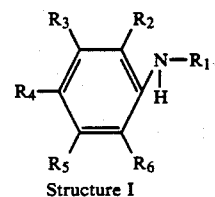

Structure I

-continued
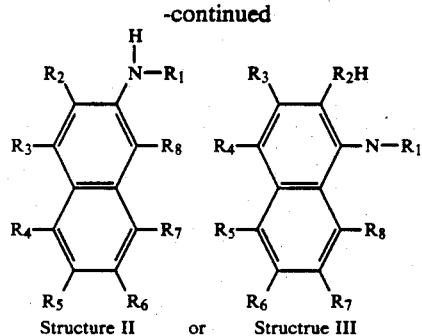
Structure II or Structure III
wherein $R_1$–$R_8$ = any one of the following groups:
—H, —$(CH_2)_nCH_3$ (n=o to 10), —$OCH_3$, —$OC_2H_5$
—Cl, —F, —Br, —I, —CN, —$SO_3H$,
$$-\underset{\underset{O}{\|}}{C}-OH \quad -\underset{\underset{CH_3}{|}}{C}=O \quad -NO_2, \quad -(CH_2)_m-\underset{\underset{X}{|}}{(CH)_n}-(CH_2)_l-CH_3$$
(where m, n, l=0 to 5 and X=any of the above groups that define R1-R8).
* * * * *

UNITED STATES PATENT AND TRADEMARK OFFICE
CERTIFICATE OF CORRECTION

PATENT NO. : 4,586,792

DATED : 6 May 1986

INVENTOR(S) : Sze C. Yang and Richard R. Durand, Jr.

It is certified that error appears in the above—identified patent and that said Letters Patent is hereby corrected as shown below:

Column 7, lines 2-14 should read

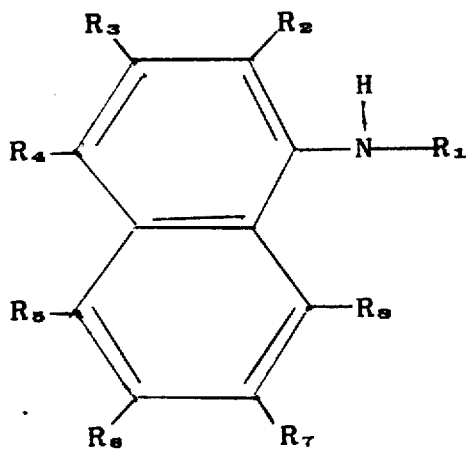

Structure III

Signed and Sealed this

Twenty-fourth Day of April, 1990

*Attest:*

HARRY F. MANBECK, JR.

*Attesting Officer*  *Commissioner of Patents and Trademarks*